United States Patent Office 3,452,096
Patented June 24, 1969

3,452,096
PROCESS FOR THE SEPARATION OF ISOMERS OF DICHLOROANILINE
William J. Paleveda, Jr., Rahway, and Erwin F. Schoenewaldt, Watchung, N.J., assignors to Merck & Co., Inc., Rahway, N.J., a corporation of New Jersey
No Drawing. Filed Dec. 10, 1965, Ser. No. 513,064
Int. Cl. C07c 85/16, 103/20
U.S. Cl. 260—582          10 Claims

ABSTRACT OF THE DISCLOSURE

A method for the separation of substantially pure 2,3-dichloroaniline from a mixture of its isomers which comprises treating said mixture at elevated temperatures: (1) with a monovalent inorganic acid or (2) with an acylating agent selected from an alkanoyl halide or an aroyl halide to afford the acid addition salt of 2,3-dichloroaniline or the N-acylated derivative of 2,3-dichloroaniline respectively, followed by the neutralization of the salt or the hydrolysis of the N-acylated intermediate thus obtained to yield the desired product.

---

The present invention relates to a process for the separation of mixtures comprising dichloroanilines.

An object of this invention is to provide economical processes for securing substantially pure 2,3-dichloroaniline, and its derivatives from mixtures comprising 2,3-dichloroaniline and at least one isomer thereof.

In a specific aspect, an object of this invention is to provide processes such as set forth in the preceding paragraph and starting with a mixture consisting essentially of 2,3-dichloroaniline, 2,5-dichloroaniline and 3,4-dichloroaniline.

Other objects will be apparent to organic chemists from the following description.

As is well known, many chemical processes and products require substantial purity of materials. This objective is not always attainable because commercially available materials sometimes are not available in sufficiently pure form and are not amenable to simple and economical purification techniques.

One such chemical which is not commercially available in or convertible by known means to pure form is 2,3-dichloroaniline. One commercial form in which this chemical is available is in a mixture consisting of the 2,3-, 2,5- and 3,4-dichloroanilines.

We have found that mixtures of 2,3-dichloroaniline and at least one isomer thereof can be treated so as to yield 2,3-dichloroaniline or its derivatives in substantially pure form. More especially, we have found that the acid addition salts and the N-acyl derivatives of 2,3-dichloroaniline are substantially insoluble as compared with the corresponding salts of its isomers. Accordingly, in accordance with a preferred embodiment of the present invention, a mixture comprising 2,3-dichloroaniline, 2,5-dichloroaniline and 3,4-dichloroaniline is reacted with a monovalent inorganic acid or an acylating agent. The resulting insoluble acid addition salts or N-acyl derivatives of 2,3-dichloroaniline may then be separated in pure form and used as such or 2,3-dichloroaniline may be regenerated in pure form by neutralizing the separated acid addition salts of the 2,3-isomer or by hydrolyzing the N-acyl derivatives of the 2,3-isomer.

In forming the insoluble acid addition salts of 2,3-dichloroaniline, we react a monovalent inorganic acid and a mixture of dichloroanilines containing the 2,3-isomer. The reaction is preferably conducted in the presence of an aqueous solvent at a temperature above ambient room temperature.

As monovalent inorganic acids useful in our reaction we may mention hydrochloric acid, hydrobromic acid, hydriodic acid and nitric acid.

Any organic solvent inert under the conditions of the reaction may be employed in the process involving the formation of the acid addition salts. An example of such a solvent is ethanol.

The amounts of reagents and reaction conditions used in the process for the formation of the acid addition salts may be varied. We employ an excess of the monovalent acid as compared with the total amount of dichloroanilines present in the reaction mixture. It has been found that a minimum of about 2 to about 10 moles of the former per mole of the dichloroanilines gives satisfactory results; whereas, a ratio from about 5 to about 7 moles of the acid per mole of total dichloroanilines is preferred. The amount of solvent should be adequate to bring the initial reactants into solution at the temperature at which the reaction is conducted. Lower amounts could be used but this is not recommended as the purity and yield of the desired products might suffer. Amounts of solvent substantially in excess of those required for solubility can be used but are not necessary and lead to waste. The amount of water employed is preferably in excess of that required to form the hydrate of the acid addition salt. The reaction is conducted at a temperature from about 50° C. to reflux the latter being preferred.

In forming the insoluble N-acyl derivatives of 2,3-dichloroaniline, an acylating agent is reacted with the mixture of dichloroanilines containing the 2,3 isomer. The reaction is conducted in the presence of a suitable solvent, but in the absence of water. The reaction is also conducted at elevated temperatures from about 50° C. to reflux, the latter being preferred.

Acylating agents capable of yielding N-alkanoyl or N-aroyl salts of 2,3-dichloroaniline may be used. Examples of such agents include acetic anhydride, propionyl chloride and benzoyl chloride.

Any organic solvent inert under the conditions of the reaction may be employed in the process involving the formation of the N-acyl derivatives. Examples of such solvents include benzene, toluene, xylene or other aromatic hydrocarbon solvents, aliphatic hydrocarbon solvents, or chlorinated hydrocarbons, such as chloroform and methylene chloride.

The amounts of reagents and the reaction conditions used in the process for the formation of the aforesaid N-acyl derivatives may be varied. An amount of acylating agent theoretically equivalent to the total of the dichloroaniline isomers may be used, although a five to ten percent excess of the former is preferred. The amount of solvent should be at least sufficient to yield a solution until the reaction has been completed and the reaction mixture has been cooled.

If desired, 2,3-dichloroaniline may be formed in substantially pure form from the acid addition salts and N-acyl derivatives of 2,3-dichloroaniline prepared in accordance with this invention. The acid addition salts can be neutralized with aqueous alkali, using conventional neutralization agents and techniques. In similar manner, the N-acyl derivatives can be hydrolyzed in an alkaline aqueous alcoholic medium, using conventional agents and techniques.

The following examples are given in order more fully to illustrate our invention. Unless otherwise specified, the parts are all by weight and the temperatures given are in degrees centigrade.

EXAMPLE 1

Preparation of 2,3-dichloroaniline hydrochloride hydrate

A mixture (100 ml., 135 g., 0.833 mole) consisting of 80.6 percent of 2,3-dichloroaniline, 11.0 percent of 2,5-dichloroaniline, and 8.4 percent of 3,4-dichloroaniline, was diluted with 300 ml. of ethanol and treated with 10 g. of activated carbon (Darco G60) for 10 minutes under agitation. The reaction mixture was filtered through diatomaceous earth filter aid (Supercel) prewet with ethanol, and the filter cake was washed three times with ethanol. A total of 200 ml. of ethanol was used for the pre-wetting and washing, bringing the total amount of ethanol used to this point to 500 ml. Water (500 ml.) and concentrated hydrochloric acid (37%, 500 ml.) were added to the light pink filtrate. The resulting precipitate was redissolved by heating the mixture to near boiling. The solution was seeded and allowed to cool to room temperature undisturbed. The resulting crystals were filtered and slurried with 100 ml. of the same water-ethanol solvent mixture and air-dried. There was obtained 108.7 g. of white hydrochloride.

The white hydrochloride was dissolved in a hot mixture of 485 ml. of ethanol, 485 ml. of water and 485 ml. of concentrated hydrochloric acid. The solution was seeded and allowed to cool to room temperature (25° C.). The resulting crystals were filtered off, slurried with 100 ml. of the same water-ethanol solvent mixture, and air-dried. There was obtained 94.5 g. of pure 2,3-dichloroaniline hydrochloride hydrate, with the following characteristics:

M.P.=207°–211°, with decomposition
Karl Fisher titration=8.52% (theory for monohydrate=8.31%)
Equiv. wt.: 215.5 (theory=216.5)
I. R. in the solid state shows NH+, phenyl and OH bands.

Example 2

Preparation of pure 2,3-dichloroaniline from 2,3-dichloroaniline hydrochloride hydrate A stirred mixture of 94.5 g. (0.436 M) of 2,3-dichloroaniline hydrochloride hydrate, as prepared in Example 1, in 378 ml. of water, was neutralized with 2.5 N sodium hydroxide solution. About 175 ml. of the base solution was required. The bottom (amine) layer was separated off and dried with anhydrous sodium sulfate. After filtering off the sodium sulfate, there was obtained 65.4 g. of 2,3-dichloroaniline, with the following characteristics:

M.P.=26–27.5°
VPC=single peak corresponding to 2,3-isomer
Equiv. wt.: 162 (theory=162).

The yield of pure amine can be increased to essentially a quantitative one by extracting the aqueous layer (top layer following neutralization) and the sodium sulfate cake with about 50 ml. of benzene and distilling the benzene in vacuo.

Example 3

Preparation of N-acetyl-2,3-dichloroaniline

A solution of 16.2 g. (0.1 M) of the mixed dichloroanilines as set forth in Example 1, 60 ml. of benzene and 10 ml. (0.106 M) of acetic anhydride was heated under reflux for one hour. The solution was allowed to cool to room temperature. The crystals obtained were filtered off, displacement washed with 10 ml. of benzene, and slurried with 15 ml. of benzene. The air-dried, off-white solid weighed 13.25 g. (M.P. 154–160°).

The off-white solid was then recrystallized by dissolving in 80 ml. of hot ethanol. The solution was allowed to cool to room temperature (25° C.). The resulting crystals were filtered off, slurried with 40 ml. of ethanol, and air-dried. There was obtained 9.25 g. of pure N-acetyl-2,3-dichloroaniline, M.P. 161–164° C.

Example 4

Preparation of 2,3-dichloroaniline from N-acetyl-2,3-dichloroaniline

A mixture of 1.0 g. of N-acetyl-2,3-dichloroaniline, as obtained in accordance with Example 3, 5 ml. of ethanol and 5 ml. of 6 N aqueous potassium hydroxide was heated under reflux for three hours. To the resulting mixture was added 5 ml. of water, and the mixture was evaporated to half its original volume in vacuo. The oily product was extracted with two 5 ml. portions of ethyl ether, dried over sodium sulfate and then evaporated to constant weight in vacuo.

There was obtained 0.8 g. of pure 2,3-dichloroaniline.

What is claimed is:

1. A method of obtaining 2,3-dichloroaniline in substantially pure form which comprises treating a mixture consisting of 2,3-dichloroaniline and at least one isomeric derivative thereof with a monovalent inorganic acid or with an acylating agent selected from among an alkanoyl halide or an aroyl halide, with the application of heating at a temperature in the range of from about 50° C. up to the reflux temperature of the reaction mixture, followed by the neutralization of the acid addition salt of 2,3-dichloroaniline or the hydrolysis of the N-acylated 2,3-dichloroaniline derivative thus obtained to the product.

2. The process of claim 1 wherein the reaction mixture containing the 2,3-dichloroaniline is treated with a monovalent inorganic acid.

3. The process of claim 2 wherein the monovalent inorganic acid is hydrochloric acid.

4. The process of claim 1 wherein the mixture containing the 2,3-dichloroaniline is treated with acetic anhydride.

5. The process of claim 1 wherein the reaction mixture is treated with hydrochloric acid and consists essentially of 2,3-dichloroaniline, 2,5-dichloroaniline and 3,4-dichloroaniline in amounts such that the ratio of the moles of hydrochloric acid to the sum total of the moles of the dichloroaniline isomers present in the mixture is from about 5 to about 7 of the former to one of the latter.

6. The process of claim 2, wherein the resulting insoluble derivative is neutralized and the resulting 2,3-dichloroaniline is removed in substantially pure form.

7. The process of claim 4, wherein the resulting insoluble derivative is hydrolyzed and the resulting 2,3-dichloroaniline is removed in substantially pure form.

8. The process of claim 5, wherein the insoluble derivative is neutralized with sodium hydroxide and 2,3-dichloroaniline is removed in substantially pure form.

9. The process of claim 7, wherein the insoluble derivative is hydrolyzed in an alkaline aqueous alcoholic medium.

10. The process of claim 9, wherein the alkali is potassium hydroxide and the aqueous alcoholic medium is ethanol-water.

References Cited

FOREIGN PATENTS 681,387  5/1930  France.

CHARLES B. PARKER, *Primary Examiner.*

PATRICIA C. IVES, *Assistant Examiner.*

U.S. Cl. X.R.

260—558, 562, 705